US012779768B2

(12) United States Patent
Asada

(10) Patent No.: US 12,779,768 B2
(45) Date of Patent: Nov. 3, 2026

(54) MOLDING SYSTEM, MOLDING METHOD, AND ARTICLE MANUFACTURING METHOD

(71) Applicant: CANON KABUSHIKI KAISHA, Tokyo (JP)

(72) Inventor: Kunihiko Asada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 18/891,935

(22) Filed: Sep. 20, 2024

(65) Prior Publication Data

US 2025/0100208 A1 Mar. 27, 2025

(30) Foreign Application Priority Data

Sep. 26, 2023 (JP) ................................ 2023-162682

(51) Int. Cl.

*B29C 59/00* (2006.01)
*B29C 59/02* (2006.01)
*B29C 37/00* (2006.01)

(52) U.S. Cl.

CPC ............ *B29C 59/002* (2013.01); *B29C 59/02* (2013.01); *B29C 2037/903* (2013.01)

(58) Field of Classification Search

CPC ... B29C 59/02; B29C 59/002; B29C 2037/90; B29C 2037/903; B29C 2037/906; G03F 7/0002; G01N 21/94; G01N 21/956
See application file for complete search history.

(56) References Cited

U.S. PATENT DOCUMENTS

2008/0062414 A1* 3/2008 Chen ......................... G03F 1/84
356/237.1

FOREIGN PATENT DOCUMENTS

| | | | | | |
|---|---|---|---|---|---|
| JP | 2018156986 | A | * | 10/2018 | |
| JP | 2022029829 | A | * | 2/2022 | |
| KR | 20230032928 | A | * | 3/2023 | G03F 7/0002 |

* cited by examiner

*Primary Examiner* — Jamel M Nelson

(74) *Attorney, Agent, or Firm* — Canon U.S.A., IP Division

(57) ABSTRACT

During a molding process for bringing a mold into contact with a substrate on which a foreign substance is inspected, thereby molding a composition on the substrate, foreign substance positions on the substrate are detected, a substrate foreign substance position where a foreign substance is present on the substrate before the molding process is started is identified among the detected foreign substance positions, and an inspection condition used to inspect a foreign substance on the substrate is updated based on the identified substrate foreign substance position. An inspection condition is thus updated, whereby it is possible to provide a configuration having an advantage in detecting a foreign substance on a substrate.

10 Claims, 13 Drawing Sheets

MOLDING SYSTEM, MOLDING METHOD, AND ARTICLE MANUFACTURING METHOD

BACKGROUND

Field

The present disclosure relates to a molding system, a molding method, and an article manufacturing method.

Description of the Related Art

The miniaturization of a semiconductor device and micro-electromechanical systems (MEMS) is increasingly being implemented, and in addition to a conventional photolithography technique, an imprint technique capable of forming a minute pattern (a structure) in several-nanometer order on a substrate draws attention. The imprint technique is a micro-fabrication technique for supplying (applying) an uncured imprint material onto a substrate and bringing the imprint material and a mold into contact with each other, thereby forming on the substrate the pattern of the imprint material corresponding to a minute uneven pattern formed on the mold.

In such an imprint technique (a molding technique), if a mold and an imprint material on a substrate are brought into contact with each other in the state where a particle (a foreign substance) is attached to the substrate or the mold, not only is it impossible to form a structure having a desired shape, but also the mold or the substrate may be broken. Thus, the development of a method for detecting a foreign substance on a substrate or a mold in advance before an imprint process and a technique for minimizing the breakage of a mold due to a foreign substance is desired.

Japanese Patent Application Laid-Open No. 2022-29829 discusses a foreign substance inspection apparatus that inspects a foreign substance on a substrate using a plurality of wavelengths to prevent the breakage of a mold or the shortening of the life of a mold.

Although various measures against a foreign substance are considered as described above, if the manufacturing of an article is increasingly miniaturized, the state of the surface of a substrate as an inspection target also differs depending on the type of the article to be manufactured or the process of manufacturing the article. Thus, even if a foreign substance on a substrate is inspected in advance always under a similar inspection condition, a foreign substance on the substrate may not be able to be detected.

In view of the above issue, a need exists for detecting a foreign substance on a substrate before a molding process is performed.

SUMMARY

The present disclosure addresses these issues and provides a configuration having an advantage in detecting a foreign substance on a substrate before a molding process is performed.

According to some embodiments, a molding system includes a foreign substance inspection apparatus configured to inspect a foreign substance on a substrate to be subjected to a molding process, and a molding apparatus configured to perform a molding process for bringing a mold into contact with the substrate on which a foreign substance is inspected by the foreign substance inspection apparatus, thereby molding a composition on the substrate, and the molding apparatus includes a detection unit configured to detect foreign substance positions on the substrate during the molding process, and a control unit configured to identify, among the foreign substance positions detected by the detection unit, a substrate foreign substance position where a foreign substance is present on the substrate before the molding process is started by the molding apparatus, wherein an inspection condition used to inspect a foreign substance by the foreign substance inspection apparatus is updated based on the substrate foreign substance position identified by the control unit.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the attached drawings. The following exemplary embodiments do not limit the disclosure according to the appended claims. Although a plurality of features is described in the exemplary embodiments, not all the plurality of features is essential for the disclosure, and the plurality of features may be optionally combined together. Further, in the attached drawings, the same or similar components are designated by the same reference numbers, and are not redundantly described.

In the specification and the attached drawings, directions are represented by an XYZ coordinate system where directions parallel to the surface of a substrate are the XY-plane. Directions parallel to the X-axis, the Y-axis, and the Z-axis in the XYZ coordinate system are an X-direction, a Y-direction, and a Z-direction, respectively. Rotation about the X-axis is represented as OX, rotation about the Y-axis is represented as OY, and rotation about the Z-axis is represented as OZ. Control or driving (movement) regarding the X-axis, the Y-axis, and the Z-axis means control or driving (movement) regarding the direction parallel to the X-axis, the direction parallel to the Y-axis, and the direction parallel to the Z-axis, respectively. Control or driving regarding a OX-axis, a OY-axis, and a OZ-axis means control or driving regarding rotation about an axis parallel to the X-axis, rotation about an axis parallel to the Y-axis, and rotation about an axis parallel to the Z-axis, respectively.

A first exemplary embodiment according to the present disclosure is described. A molding system according to the present disclosure is a system including a molding apparatus 100 that molds a composition on a substrate using a mold, and a foreign substance inspection apparatus 300. Examples of the molding apparatus 100 include an imprint apparatus and a planarization apparatus. The imprint apparatus is an apparatus that brings a mold having an uneven pattern into contact with a composition on a substrate, thereby forming the pattern on the composition (transferring the pattern to the composition). The planarization apparatus is an apparatus that performs a planarization process for bringing a mold (a member or super straight) having a flat surface into contact with a composition on a substrate, thereby planarizing the surface of the composition. Although the present exemplary embodiment is described taking the imprint apparatus as an example of the molding apparatus 100, the following configuration and processing are also applicable to the planarization apparatus.

Figure 1:
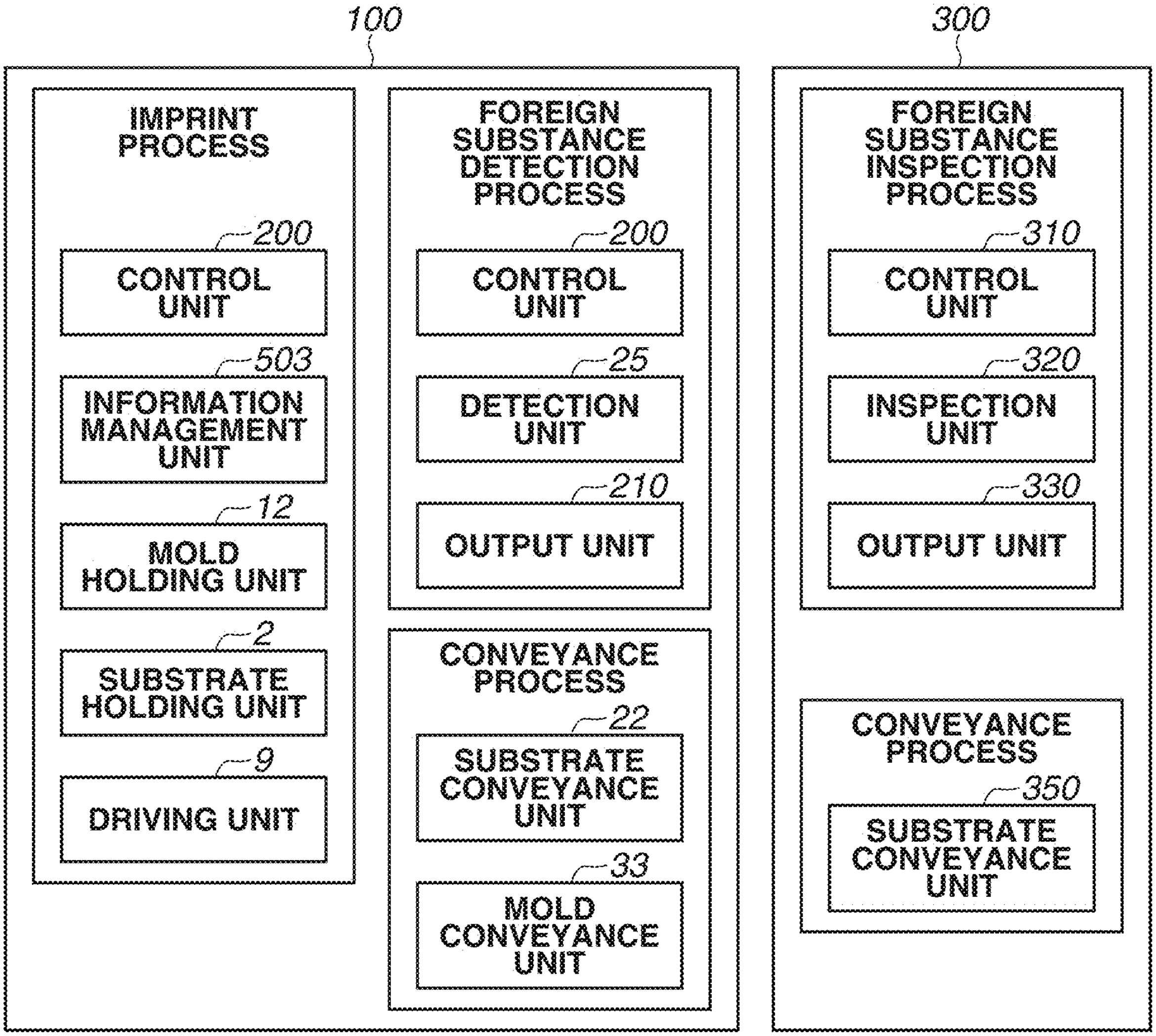
FIG. 1 is a schematic diagram illustrating a configuration of a molding system.

FIG. 1 is a schematic diagram illustrating the functional configuration of the molding system including the imprint apparatus 100 and the foreign substance inspection apparatus 300 that performs foreign substance inspection in advance on a substrate to be carried into the imprint apparatus 100.

The imprint apparatus 100 has the function of performing an imprint process (a molding process), a foreign substance detection process, and a conveyance process. The imprint process is performed by a controller or control unit 200 controlling an information management unit 503, a mold holding unit 12, a substrate holding unit 2, and a driving unit 9. The control unit 200 calculates the driving timing and the driving amount of each unit and gives a command.

The information management unit 503 collects information regarding a mold 11 and a substrate 1, foreign substance position information 507, and substrate foreign substance information 509 and stores these pieces of information in a storage unit such as a memory, and thereby can manage these pieces of information. The information management unit 503 can also transmit information to the control unit 200. The mold holding unit 12 holds the mold 11, and the substrate holding unit 2 holds the substrate 1. Based on a command from the control unit 200, the mold holding unit 12 and the substrate holding unit 2 cooperate with the driving unit 9 to hold the mold 11 and the substrate 1, respectively, and perform the molding process.

In the foreign substance detection process performed in the imprint apparatus 100, the control unit 200 controls a detection unit 25 to detect a foreign substance present on the substrate 1 and output foreign substance information during the imprint process. The control unit 200 sends a command to the detection unit 25 based on a parameter set in advance, thereby executing the foreign substance detection. An output unit 210 can transmit the result of the foreign substance detection to another system such as the foreign substance inspection apparatus 300.

The conveyance process is performed by a substrate conveyance unit 22 and a mold conveyance unit 33. The substrate conveyance unit 22 carries the substrate 1 into the imprint apparatus 100 from outside or carries the substrate 1 out of the imprint apparatus 100. The mold conveyance unit 33 carries the mold 11 into the imprint apparatus 100 from outside or carries the mold 11 out of the imprint apparatus 100.

Foreign substance inspection on the substrate 1 performed outside the imprint apparatus 100 is performed by the foreign substance inspection apparatus 300. The foreign substance inspection apparatus 300 has the function of performing a foreign substance inspection process and a conveyance process. In the foreign substance inspection process performed by the foreign substance inspection apparatus 300, a controller or control unit 310 can control an inspection unit 320 to inspect a foreign substance on the substrate 1 before the substrate 1 is carried into the imprint apparatus 100, and output the result of the inspection. An output unit 330 can transmit the result of the foreign substance inspection to another system such as the imprint apparatus 100.

The conveyance process is performed by a substrate conveyance unit 350. The substrate conveyance unit 350 carries the substrate 1 as an inspection target into the foreign substance inspection apparatus 300 from outside or carries the substrate 1 out of the foreign substance inspection apparatus 300 after the foreign substance inspection ends.

Figure 2:
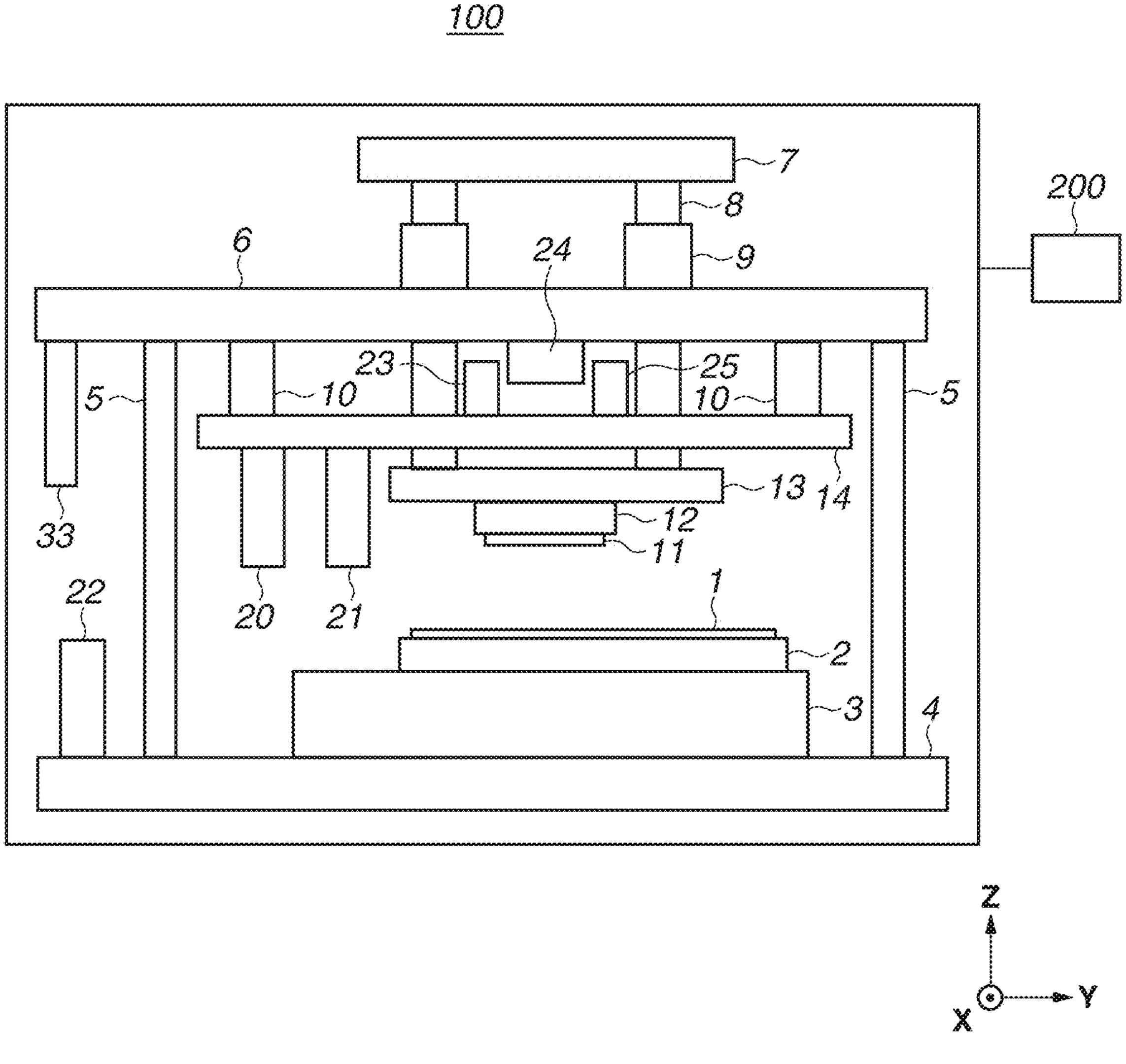
FIG. 2 is a schematic diagram illustrating a configuration of a molding apparatus (an imprint apparatus).

FIG. 2 is a schematic diagram illustrating the configuration of the imprint apparatus 100. The imprint apparatus 100 performs an imprint process for forming a pattern using the mold 11. The imprint apparatus 100 brings an imprint material supplied onto the substrate 1 and the mold 11 into contact with each other and applies curing energy to the imprint material, thereby molding the pattern of a cured product to which an uneven pattern of the mold 11 is transferred.

A pattern molding process is an imprint process for the purpose of repeatedly molding the pattern of the mold 11 on the substrate 1 while changing the position of the substrate 1. Hereinafter, a processing area where the pattern is molded on the substrate 1 using the mold 11 once will be referred to as a "field (shot region)". That is, a plurality of processing fields is provided on the substrate 1, and the plurality of processing fields is processed in order.

As the imprint material, a curable composition that cures by receiving curing energy (also occasionally referred to as "a resin in an uncured state") is used. As the curing energy, an electromagnetic wave or heat is used. As the electromagnetic wave, for example, light of which the wavelength is selected from the range of 10 nm (nanometers) or more and 1 mm (millimeters) or less, such as infrared light, visible light, or ultraviolet light, is used.

The curable composition is a composition that cures by emitting light to the curable composition or heating the curable composition. The light-curable composition that cures by emitting light to the curable composition at least contains a polymerizable compound and a photopolymerization initiator, and may contain a non-polymerizable compound or a solvent, where desired. The non-polymerizable compound is at least one type selected from a group of a sensitizer, a hydrogen donor, an internal mold release agent, a surfactant, an antioxidant, and a polymer component.

The imprint material may be applied in the form of a film onto the substrate 1. Alternatively, the imprint material may be applied in the form of a droplet or in the form of an island or a film formed by connecting a plurality of droplets, onto the substrate 1. The viscosity (the viscosity at 25° C.

(Celsius)) of the imprint material is 1 mPa·s (millipascal seconds) or more and 100 mPa·s or less, for example.

The substrate 1 is carried into the imprint apparatus 100 from outside by the substrate conveyance unit 22 that includes a conveyance hand and held by the chuck (the substrate holding unit) 2. A substrate stage 3 is placed on a base surface plate 4 and moves while holding the substrate 1. The substrate stage 3 positions the substrate 1 at a predetermined position in the X-axis direction and the Y-axis direction.

The mold 11 has a pattern to be transferred to the substrate 1 on its surface and is fixed to the chuck (the mold holding unit) 12. The chuck 12 is placed on a mold stage 13. The mold stage 13 has the function of correcting the inclination of the mold 11 about the Z-axis. Each of the chuck 12 and the mold stage 13 includes an opening (not illustrated) that transmits light emitted through a collimator lens from a light source 24. In the chuck 12 (or the mold stage 13), a load cell for detecting the pressing force (the pressing pressure) of the mold 11 is placed.

One end of each of guide bars 8 is fixed to the mold stage 13, the guide bar 8 penetrates a top plate 6, and a guide bar plate 7 fixes the other end of the guide bar 8. An elevating unit 9 functions as a driving unit and drives the guide bars 8 in the Z-axis direction, thereby bringing the mold 11 held by the chuck 12 into contact with (pressing the mold 11 against) the imprint material on the substrate 1 or pulling the mold 11 away from the imprint material on the substrate 1. An alignment shelf 14 is suspended by the top plate 6 through supporting columns 10. The guide bars 8 penetrate the alignment shelf 14.

A through-the-mold (TTM) alignment scope 23 for alignment includes an optical system and an imaging system for observing a reference mark on the substrate stage 3 and an alignment mark provided on the mold 11. The TTM alignment scope 23 is used in so-called die-by-die alignment for measuring the relative position between a mark on the substrate 1 and the alignment mark provided on the mold 11 with respect to each field and correcting the positional shift in the relative position.

A supply unit 20 includes a discharge port (a nozzle) that discharges a droplet of the imprint material to the substrate 1. The supply unit 20 supplies (applies) the imprint material to each of the plurality of fields on the substrate 1. For example, the supply unit 20 can employ a piezo jet method or a micro solenoid method and supply a small volume, namely about 1 pL (picoliter), of the imprint material onto the substrate 1. The number of discharge ports in the supply unit 20 is not limited, and may be one (a single nozzle), or may exceed 100 (i.e., the supply unit 20 may include a linear nozzle array, or may combine a plurality of linear nozzle arrays).

An off-axis alignment (OA) scope 21 is placed on the alignment shelf 14. The OA scope 21 is used in a global alignment process for measuring alignment marks provided on the plurality of fields on the substrate 1 and determining the position of each of the plurality of fields. The TTM alignment scope 23 obtains the positional relationship between the mold 11 and the substrate stage 3, and the OA scope 21 obtains the positional relationship between the substrate stage 3 and the substrate 1, whereby it is possible to relatively align the mold 11 and the substrate 1.

A spread camera 25 is placed at a position where the spread camera 25 commands a bird's-eye view of the mold 11, and can observe the mold 11 in contact with the imprint material on the substrate 1 and the substrate 1 in a superimposed manner at the same angle of view. The spread camera 25 captures the state where the imprint material supplied onto the substrate 1 is spread by the mold 11, and thereby can observe the state where the imprint material fills the mold 11. That is, the spread camera 25 functions as the detection unit 25 that detects a foreign substance during an imprint process in the imprint apparatus 100.

The control unit 200 includes a central processing unit (CPU) and a memory and controls the entirety of the imprint apparatus 100. The control unit 200 controls the components of the imprint apparatus 100 to perform an imprint process (a molding process), a foreign substance inspection process, a substrate foreign substance position identification process, and a conveyance process.

Figure 3:
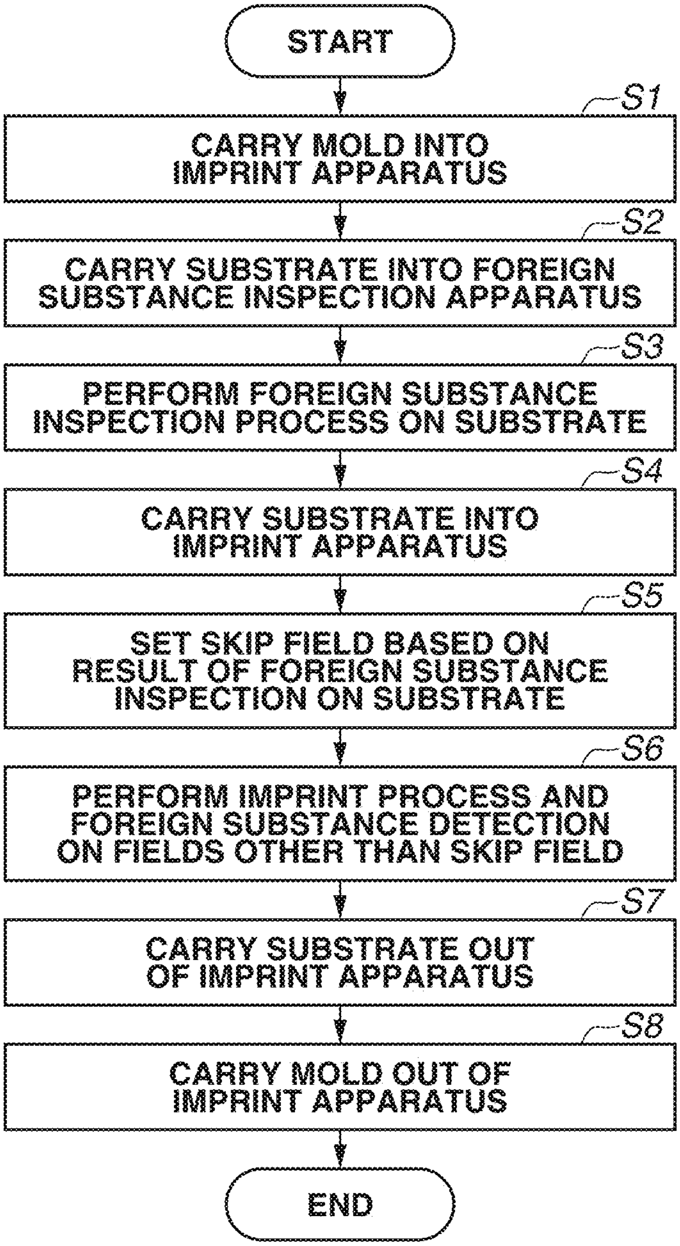
FIG. 3 is a flowchart illustrating a flow of a molding process (an imprint process).

Next, with reference to a flowchart in FIG. 3, a description is given of the flow of an imprint process using the molding system according to the present exemplary embodiment. The processing illustrated in the flowchart in FIG. 3 is achieved by the control units 200 and 310 reading and executing stored control programs. Although the present exemplary embodiment is described using an example where the control unit 200 of the imprint apparatus 100 and the control unit 310 of the foreign substance inspection apparatus 300 are separately provided, these control units may be a common control unit.

In step S1, the control unit 200 controls the mold conveyance unit 33 of the imprint apparatus 100 to carry the mold 11 into the imprint apparatus 100 and cause the chuck 12 to hold the mold 11. The mold 11 only needs to be carried into the imprint apparatus 100 by the time when the imprint process is performed.

In step S2, the control unit 310 controls the substrate conveyance unit 350 to carry the substrate 1 to be subjected to the imprint process by the imprint apparatus 100 into the foreign substance inspection apparatus 300. Then, in step S3, the control unit 310 performs a foreign substance inspection process for inspecting the substrate 1 using the inspection unit 320. If a foreign substance is present, the control unit 310 outputs the position of the foreign substance and size information regarding the foreign substance and stores the position and the size information in a storage unit. In step S4, the control unit 310 controls the substrate conveyance unit 350 to carry the substrate 1 out of the foreign substance inspection apparatus 300, and the control unit 200 controls the substrate conveyance unit 22 to carry the substrate 1 into the imprint apparatus 100 and cause the chuck 2 to hold the substrate 1.

In step S5, the control unit 200 receives the result of the foreign substance inspection process on the substrate 1 from the output unit 330 of the foreign substance inspection apparatus 300. Then, to prevent the situation where the mold 11 is destroyed by performing the imprint process on a field where the foreign substance is present, the control unit 200 sets the field where the foreign substance is present as a skip field on which the imprint process is not performed. Specifically, the control unit 200 identifies a skip field based on the position of the foreign substance acquired by the foreign substance inspection performed using the inspection unit 320 and the position of the field on the substrate 1.

In step S6, the control unit 200 repeatedly performs the imprint process (the molding process) on a plurality of fields other than the field identified as the skip field. During the imprint process in which the composition on the substrate 1 and the mold 11 are in contact with each other, the detection unit 25 in the imprint apparatus 100 detects a foreign substance and outputs position information regarding the foreign substance. Specifically, the detection unit 25 can acquire position information regarding the position of the foreign substance on the substrate 1 based on an image from the spread camera 25. The details of the output process performed based on the foreign substance information will be described below.

In step S7, after the imprint process is performed on all the fields on which the imprint process can be performed, the control unit 200 controls the substrate conveyance unit 22 to carry the substrate 1 out of the imprint apparatus 100. Then, in step S8, if there is not a next substrate 1 that is to be processed, the control unit 200 controls the mold conveyance unit 33 to carry the mold 11 out of the imprint apparatus 100, and the processing ends.

Although not illustrated, if many foreign substances are found in the foreign substance detection in step S6, the imprint process may be immediately stopped. Alternatively, in a case where a foreign substance size that can be accepted on the mold 11 or the substrate 1 or the number of fields where foreign substances can be accepted is defined, the timing of the process of stopping the imprint process may be determined according to the purpose, for example, by continuing the imprint process until the definition is reached. In a case where a plurality of substrates 1 is processed in succession, at the timing when a substrate 1 inspected by the foreign substance inspection apparatus 300 is carried into the imprint apparatus 100, a next substrate 1 may be carried into the foreign substance inspection apparatus 300.

Figure 4A:
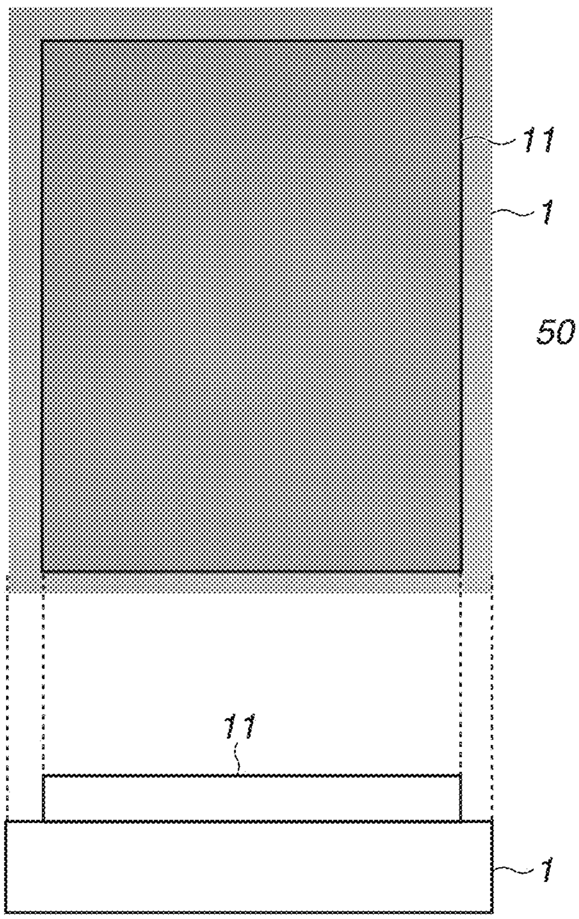
FIGS. 4A and 4B are diagrams illustrating a state of foreign substance detection performed during the imprint process.
Figure 4B:
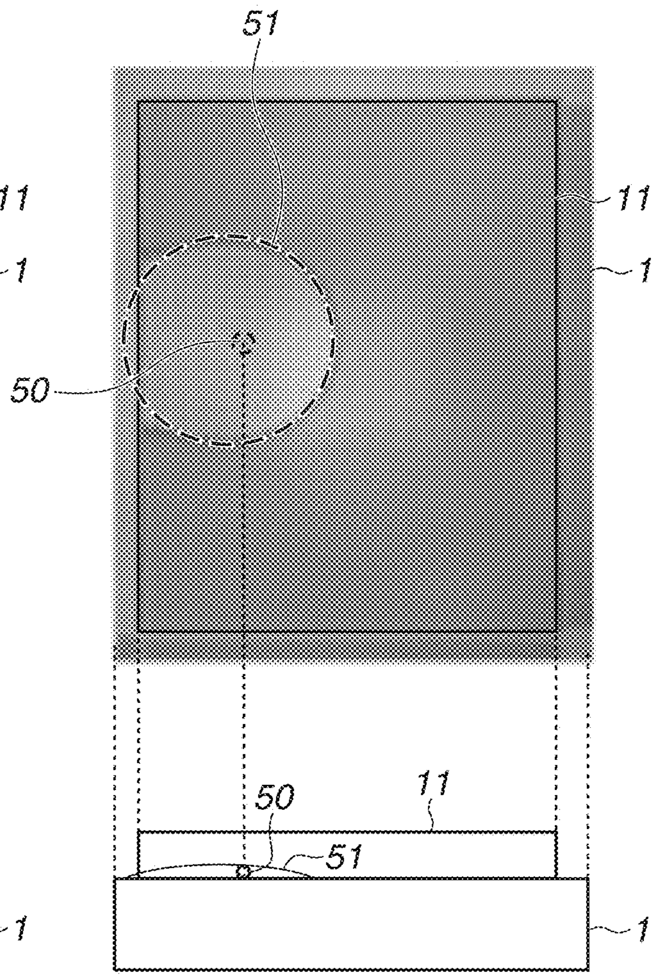

Next, a specific description is given of an example of the technique for the foreign substance detection performed by the imprint apparatus 100 in step S6. FIGS. 4A and 4B illustrate images obtained by the spread camera 25 capturing fields during the imprint process. FIG. 4A illustrates an image of a field where a foreign substance is not present that is acquired before the foreign substance detection process. FIG. 4B illustrates an image of a field where a foreign substance 50 is present that is acquired in the foreign substance detection process. In the foreign substance detection process, a reference image and an image acquired at the same timing in the imprint process are compared with each other, whereby it is possible to determine the presence or absence of a foreign substance.

As illustrated in FIG. 4B, if a foreign substance 50 is present between the mold 11 and the substrate 1 in the imprint process, a region 51 where the mold 11 cannot come into contact with the substrate 1 occurs in concentric circles centered at the foreign substance 50. Since such a region 51 can be distinguished in an image from the spread camera 25, it is possible to determine the presence or absence of a foreign substance and the position of the foreign substance by comparing a reference image and a processed image.

On the other hand, for example, the inspection unit 320 used in the foreign substance inspection performed by the foreign substance inspection apparatus 300 in step S3 can be composed of an emission portion and a light reception portion. The inspection unit 320 is configured to cause the light reception portion to receive light emitted from the emission portion and reflected on the substrate 1, and thereby can evaluate the state of the surface of the substrate 1. The inspection unit 320 can be provided so that the inspection unit 320 can detect the position and the size of a foreign substance on the substrate 1. Alternatively, a method for determining the presence or absence of a foreign substance by grasping the shape of the substrate 1 using a non-contact sensor or by acquiring an image of the substrate 1 and comparing the acquired image with a reference image in which a foreign substance is not present is possible. Although the technique for the foreign substance inspection has been described by citing examples, the technique is not limited to the above techniques so long as the technique can identify the presence or absence of a foreign substance and the foreign substance position.

Figure 5:
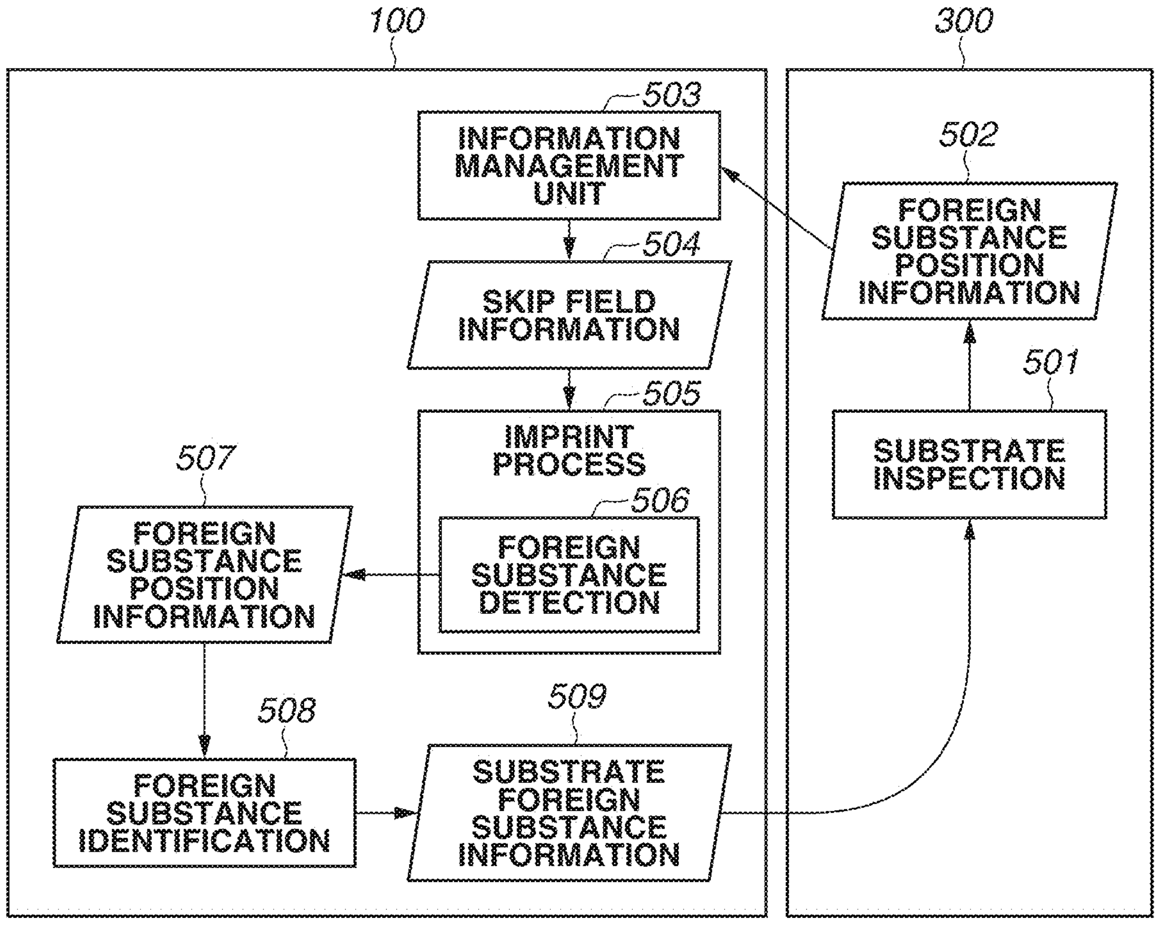
FIG. 5 is a data flow diagram of the molding system.
Figure 6A:
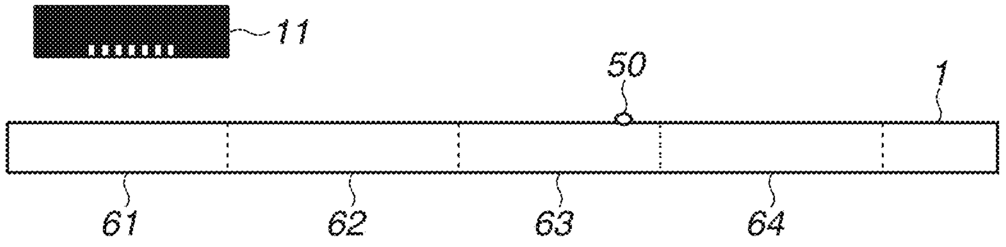
FIGS. 6A to 6D are diagrams illustrating a state where a foreign substance on a substrate becomes attached to a mold.
Figure 6B:
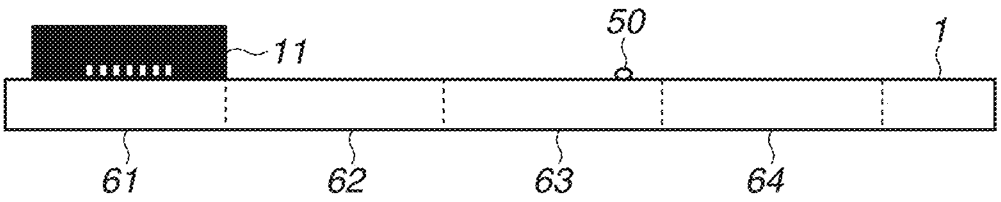
Figure 6C:
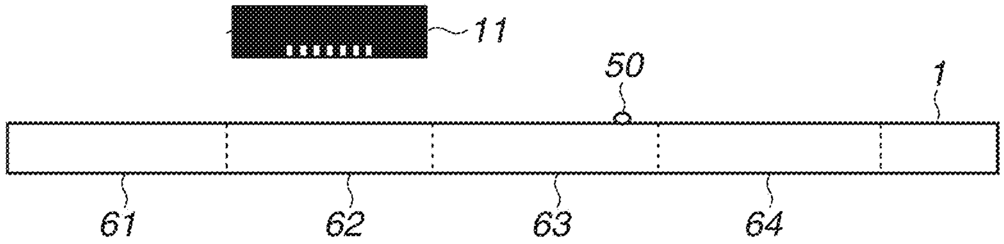
Figure 6D:
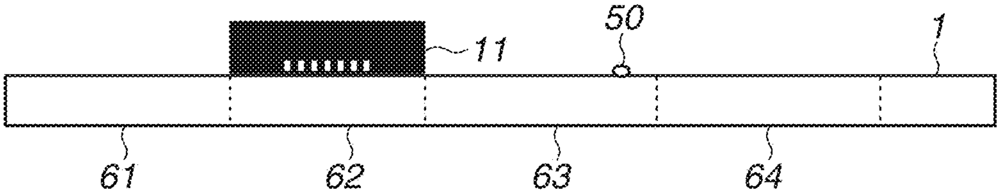
Figure 7A:
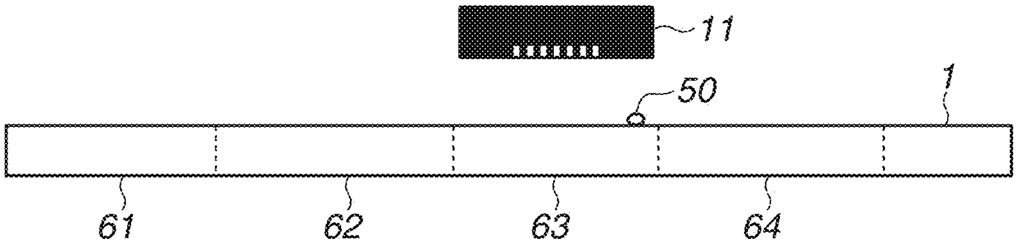
FIGS. 7A to 7D are diagrams illustrating the state where the foreign substance on the substrate becomes attached to the mold.
Figure 7B:
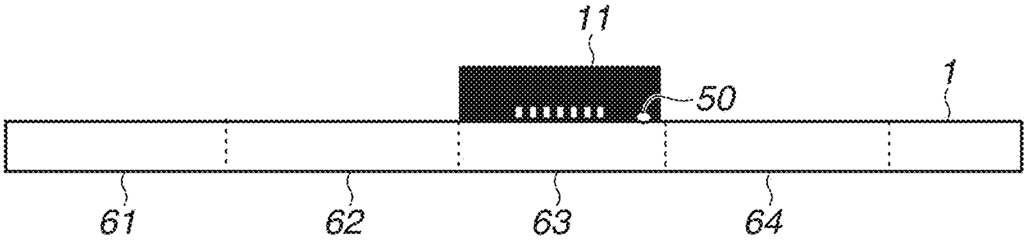
Figure 7C:
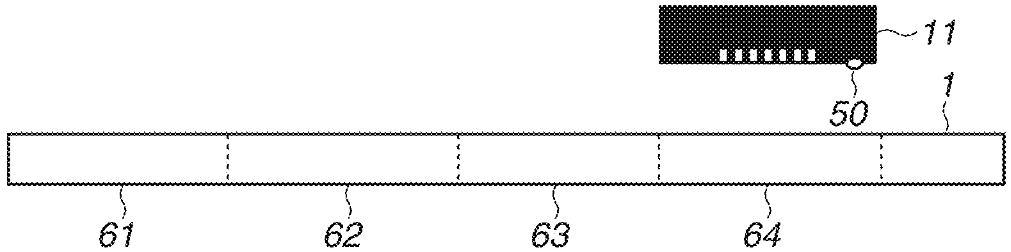
Figure 7D:
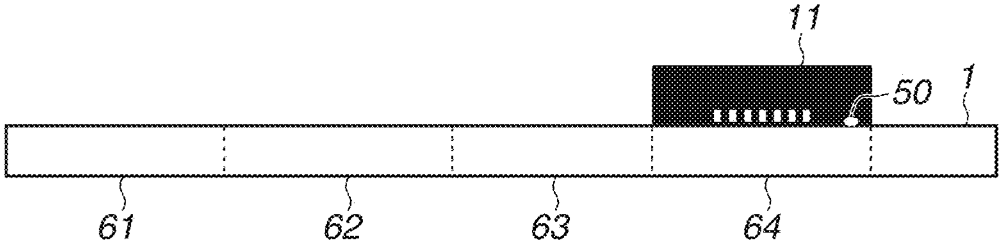

Next, with reference to a data flow diagram in FIG. 5, a description is given of the flow in which foreign substance information regarding a foreign substance detected by the imprint apparatus 100 is fed back to the foreign substance inspection apparatus 300. FIG. 5 is a diagram illustrating a generation process for generating foreign substance information in the foreign substance inspection apparatus 300 and the imprint apparatus 100 and the flow of the generation process.

The inspection unit 320 of the foreign substance inspection apparatus 300 performs substrate inspection 501 on the substrate 1 before the substrate 1 is carried into the imprint apparatus 100. The output unit 330 outputs foreign substance position information 502 to the information management unit 503 of the imprint apparatus 100, and the information management unit 503 adds the foreign substance position information 502 as management information.

The information management unit 503 stores various pieces of information such as the size of the mold 11 required for the imprint process, information regarding positions such as the pressing position of the substrate 1, the processing order of fields on which the imprint process is performed, and the execution status of the imprint process. Position information regarding the imprint process and position information regarding the substrate 1 are combined together, whereby it is possible to identify a field on which the imprint process is not performed (step S5). The information management unit 503 generates and outputs skip field information 504 that identifies a field on which the imprint process is not performed because the mold 11 may be broken.

Using the skip field information 504, an imprint process 505 is performed on fields other than the skip field (step S6). Then, during the imprint process 505, a foreign substance detection process 506 is performed using the detection unit 25 of the imprint apparatus 100. If a foreign substance is detected, foreign substance position information 507 is output from the output unit 210 to the memory.

Then, based on the output foreign substance position information 507 and the processing order of the molding process and the execution status of the imprint that are managed by the information management unit 503 of the imprint apparatus 100, foreign substance identification 508 is performed, thereby identifying substrate foreign substance information 509 to be output to the foreign substance inspection apparatus 300. That is, the control unit 200 functions as a foreign substance identification unit and identifies the substrate foreign substance information 509. Although the details of the foreign substance identification 508 will be described below, the substrate foreign substance information 509 narrowed down to the substrate foreign substance position of a substrate foreign substance present on the substrate 1 before the imprint process 505 on the substrate 1 is started is identified as the substrate foreign substance information 509 to be output to the foreign substance inspection apparatus 300.

If a foreign substance is present in the foreign substance inspection apparatus 300, a field where the foreign substance is present is set as a skip field. However, the foreign substance detected by the detection unit 25 of the imprint apparatus 100 can be said to be a foreign substance overlooked by the foreign substance inspection apparatus 300. That is, only information regarding a foreign substance overlooked by the foreign substance inspection apparatus

300 is identified as the substrate foreign substance information 509 to be output to the foreign substance inspection apparatus 300.

Then, based on detection result data of the substrate foreign substance information 509 received from the imprint apparatus 100, the foreign substance inspection apparatus 300 gives control feedback to an inspection condition so that a foreign substance overlooked in advance substrate inspection can be detected.

Although the feedback method differs depending on the type of the system of the inspection unit 320 of the foreign substance inspection apparatus 300, if the system of the inspection unit 320 detects a foreign substance on the substrate 1 using a non-contact sensor, the foreign substance inspection apparatus 300 changes a threshold parameter for determining the presence or absence of a foreign substance. If the system of the inspection unit 320 uses image processing, the foreign substance inspection apparatus 300 changes a parameter for an image processing filter that is currently used. That is, based on foreign substance information acquired in advance by the foreign substance inspection apparatus 300 and foreign substance information acquired by the imprint apparatus 100, it is possible to give feedback to an inspection control parameter (an inspection condition) for the inspection unit 320 of the foreign substance inspection apparatus 300.

Next, with reference to FIGS. 6A to 6D to FIGS. 9A to 9C, the foreign substance identification 508 in FIG. 5 is described in detail. The foreign substance identification 508 is a process performed to identify only information regarding a foreign substance overlooked by the foreign substance inspection apparatus 300. That is, only foreign substance information regarding an overlooked foreign substance is extracted by the foreign substance identification 508 and output as the substrate foreign substance information 509 to the foreign substance inspection apparatus 300. Although an example is described where this foreign substance identification process is performed in the imprint apparatus 100, the foreign substance identification process may be performed by the foreign substance inspection apparatus 300.

FIGS. 6A to 6D and FIGS. 7A to 7D illustrate in order the state where, when the imprint process is performed on four fields on the substrate 1 using the mold 11, a foreign substance 50 on the substrate 1 moves to the mold 11 and becomes attached to the mold 11 in the middle of the imprint process. In this case, the imprint apparatus 100 does not detect a foreign substance on a first field 61 and a second field 62. Then, the detection unit 25 of the imprint apparatus 100 detects that foreign substances are present on a third field 63 and a fourth field 64 in the imprint process. The foreign substance on the fourth field 64, however, is caused by the foreign substance on the third field 63, and therefore, it is preferably to delete information regarding the fourth field 64 and use information regarding only the third field 63 as information regarding the position of a foreign substance that is to be fed back to the foreign substance inspection apparatus 300. That is, regarding foreign substances that occur in succession at the same position in fields, it is preferable to identify only the foreign substance position of the foreign substance that occurs first as the position where the foreign substance is present before the imprint process is started by the imprint apparatus 100, and output the identified foreign substance position as the substrate foreign substance information 509.

Generally, a plurality of substrates 1 in the same lot is subjected to an imprint process using a common mold 11. Thus, in addition to this example, a similar thing may occur also if substrates 1 are switched. That is, it is also possible that the foreign substance 50 is present on the last field on which the imprint process is performed last on the first substrate 1, and the foreign substance 50 moves to the mold 11 by the imprint process performed at this position. Then, if the imprint process is performed on the second substrate 1 without replacing the mold 11, the detection unit 25 of the imprint apparatus 100 detects that a foreign substance is present on a field also on the second substrate 1 in the imprint process due to the same foreign substance 50.

That is, regarding foreign substances that occur in succession at the same position in fields even on different substrates 1, it is preferable to identify only the foreign substance position of the foreign substance that occurs first, and output the identified foreign substance position as the substrate foreign substance information 509.

Figure 8:
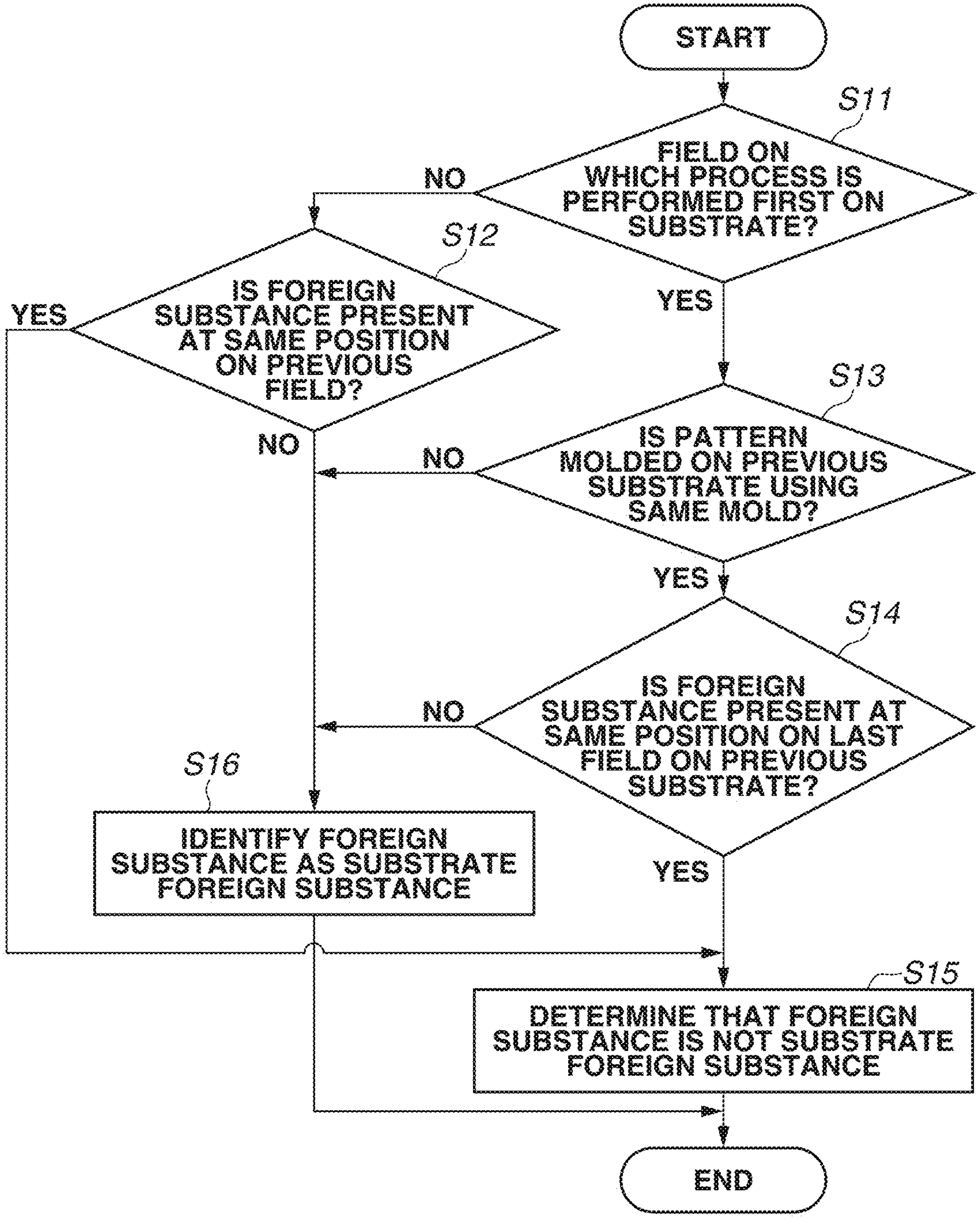
FIG. 8 is a flowchart illustrating a flow in which it is identified whether a foreign substance detected by the imprint apparatus is a substrate foreign substance that is to be fed back to a foreign substance inspection apparatus.

With reference to a flowchart in FIG. 8, a description is given of the flow of the foreign substance identification process 508 for, as described above, identifying whether a foreign substance detected by the detection unit 25 of the imprint apparatus 100 corresponds to the substrate foreign substance information 509 to be output to the foreign substance inspection apparatus 300 for feedback. The processing illustrated in the flowchart in FIG. 8 is achieved by the control unit 200 reading and executing a stored control program. The following processing is processing performed when a foreign substance is detected by the detection unit 25.

In step S11, if a foreign substance detected by the detection unit 25 is detected, the control unit 200 determines whether a field where the foreign substance is detected is a field on which the imprint process is performed first on the substrate 1. If it is determined in step S11 that the field is not the first field but a field on which the imprint process is performed second or later (NO in step S11), there is not a possibility that the detected foreign substance is a foreign substance taken over from the previous substrate 1. Thus, the processing proceeds to step S12. If the field is the first field (YES in step S11), the processing proceeds to step S13.

In step S13, the control unit 200 determines whether the imprint process is performed on the previous substrate 1 using the same mold 11. If it is determined in step S13 that the imprint process is not performed on the previous substrate 1 using the same mold 11 (NO in step S13), it can be said that a foreign substance is present on the field on which the process is performed. Thus, in step S16, the control unit 200 identifies the field as a field where a substrate foreign substance is present.

If it is determined in step S13 that the imprint process is performed on the previous substrate 1 using the same mold 11 (YES in step S13), the processing proceeds to step S14. In step S14, the control unit 200 determines whether a foreign substance is present at the same position on a field on which the imprint process is performed last on the previous substrate 1. In step S14, if a foreign substance is present (a foreign substance is detected by the detection unit 25) at the same position on the field on which the imprint process is performed last on the previous substrate 1 (YES in step S14), there is a high possibility that the foreign substance is taken over. Thus, in step S15, the control unit 200 determines that the foreign substance is not a substrate foreign substance. That is, the control unit 200 determines that the detection of the foreign substance is foreign substance detection that occurs as a result of the movement of a foreign substance present on the substrate 1 before the imprint process on the field to the mold 11. Thus, the control unit 200 determines that information regarding the foreign substance is not foreign substance information that is to be output as the substrate foreign substance information 509.

On the other hand, in step S14, if a foreign substance is not present at the same position on the field on which the imprint process is performed last on the previous substrate 1 (NO in step S14), it can be said that a foreign substance is present on the field on which the process is performed. Thus, in step S16, the control unit 200 identifies the field as a field where a substrate foreign substance is present.

In step S12, the control unit 200 determines whether a foreign substance is present at the same position on the previous field. If it is determined in step S12 that a foreign substance is present at the same position (YES in step S12), there is a high possibility that the foreign substance is taken over. Thus, in step S15, the control unit 200 determines that the foreign substance is not a substrate foreign substance. That is, the control unit 200 determines that the detection of the foreign substance is foreign substance detection that occurs as a result of the movement of a foreign substance present on the substrate 1 before the imprint process on the field to the mold 11. Thus, the control unit 200 determines that information regarding the foreign substance is not foreign substance information that is to be output as the substrate foreign substance information 509.

On the other hand, in step S12, if a foreign substance is not present at the same position on the previous field (NO in step S12), it can be said that a foreign substance is present on the field on which the process is performed. Thus, in step S16, the control unit 200 identifies the field as a field where a substrate foreign substance is present.

By the above processing, information regarding a foreign substance identified as a substrate foreign substance among foreign substances detected by the detection unit 25 of the imprint apparatus 100 is output as the substrate foreign substance information 509 to the foreign substance inspection apparatus 300.

In the description of the processing of the flowchart in FIG. 8, a foreign substance is not present from the beginning on the mold 11 after replacement. This is because, generally, before the mold 11 is used in the imprint apparatus 100, a cleaning process for removing a foreign substance is performed on the mold 11, and further, an imprint process for confirming the surface of the mold 11 is performed on several fields using another substrate. Thus, it can be said that a foreign substance is not present. The possibility that a foreign substance is attached to the mold 11 on the first field on the mold 11 after replacement is thus minimized, whereby it is possible to make a more correct determination.

Figure 9A:
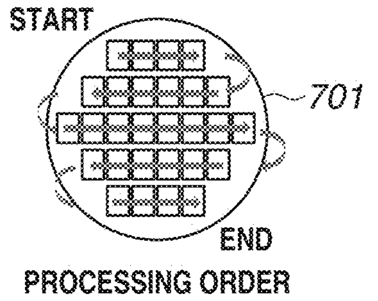
FIGS. 9A to 9C are diagrams illustrating a state where a foreign substance detected by the imprint apparatus is identified as a substrate foreign substance that is to be fed back to the foreign substance inspection apparatus.
Figure 9B:
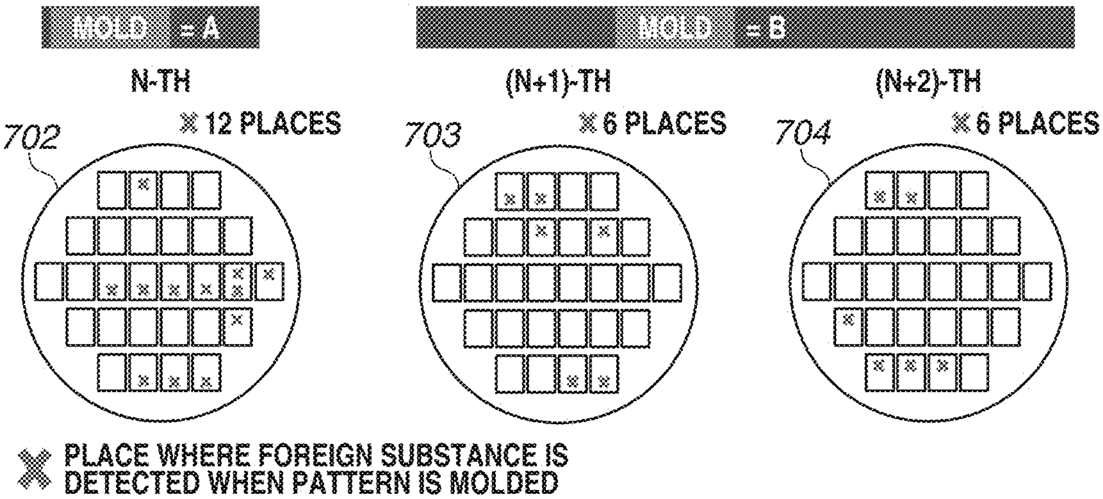
Figure 9C:
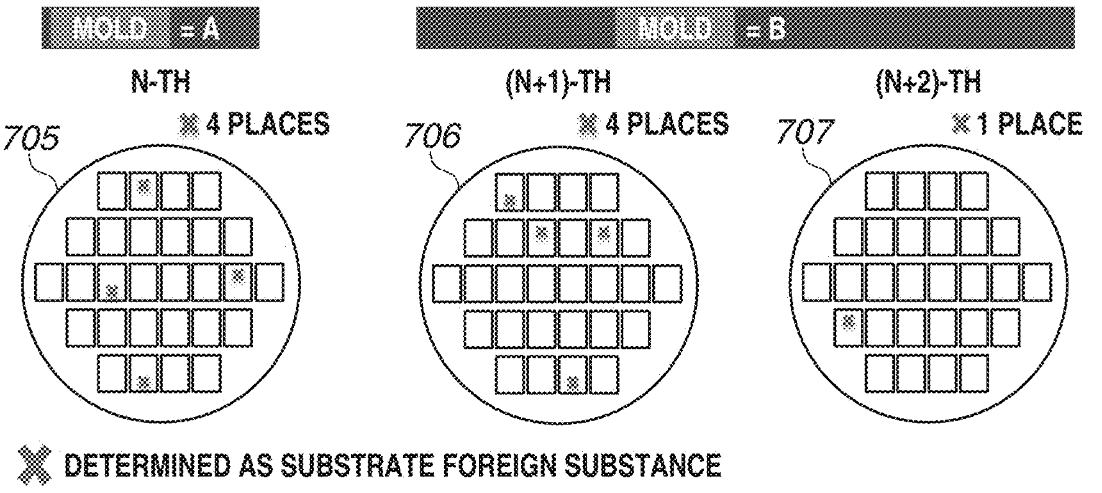

FIGS. 9A to 9C are diagrams specifically illustrating the state where the determinations are made based on the flowchart in FIG. 8.

The processing order of a substrate is as follows. As illustrated in FIG. 9A, the processing starts from the top left field on the substrate and proceeds to the right. If the processing reaches the right end field, the processing proceeds from right to left in a row below the right end field. Then, if the processing reaches the left end field, the processing proceeds from left to right in a row below the left end field. In this processing order, the right end field in the bottom row is the last field. On a next substrate, the processing is performed again from the top left field in a similar order.

FIG. 9B illustrates the state where the imprint process is performed on three substrates (an N-th substrate, an (N+1)-th substrate, and an (N+2)-th substrate) in the processing order illustrated in FIG. 9A. In the imprint process on the three substrates, two types of molds (A and B) are used. On the N-th substrate, the mold A is used. On the (N+1)-th substrate, the mold A is changed to the mold B, and the mold B is used. On the (N+2)-th substrate, the mold B is continuously used.

In FIG. 9B, a foreign substance detected by the imprint apparatus 100 is indicated by "x". For convenience of description, a foreign substance is detected at only two places, namely an upper position and a lower position, in each field. An actual foreign substance can occur at any position in a field. Thus, actually, foreign substance position determination distances using the center position of a foreign substance for determining whether a foreign substance is the same foreign substance may be set, and using these distances, it may be determined whether a foreign substance is the same foreign substance.

In FIG. 9B, on the N-th substrate, there are twelve fields where it is determined that a foreign substance is present in the foreign substance detection during the imprint process. On the (N+1)-th substrate, there are six fields where it is determined that a foreign substance is present in the foreign substance detection during the imprint process. On the (N+2)-th substrate, there are six fields where it is determined that a foreign substance is present in the foreign substance detection during the imprint process. FIG. 9C illustrates the results of identifying, from these foreign substance positions, information that is to be output to the foreign substance inspection apparatus 300 as the substrate foreign substance information 509 in the foreign substance identification process 508 illustrated in the flowchart in FIG. 8. That is, on the N-th substrate, four foreign substances are identified as substrate foreign substances. On the (N+1)-th substrate, four foreign substances are identified as substrate foreign substances. On the (N+2)-th substrate, a single foreign substance is identified as a substrate foreign substance.

As described above, the process of deleting foreign substance information that occurs due to a foreign substance that moves from the substrate 1 to the mold 11 from foreign substance information regarding foreign substances detected by the imprint apparatus 100 during the imprint process is performed, and the result of the process (substrate foreign substance information) is transmitted to the foreign substance inspection apparatus 300. Using this result, it is possible to give feedback to an inspection condition when the substrate inspection 501 is performed by the foreign substance inspection apparatus 300, and improve the foreign substance detection accuracy of the foreign substance inspection apparatus 300.

Figure 10:
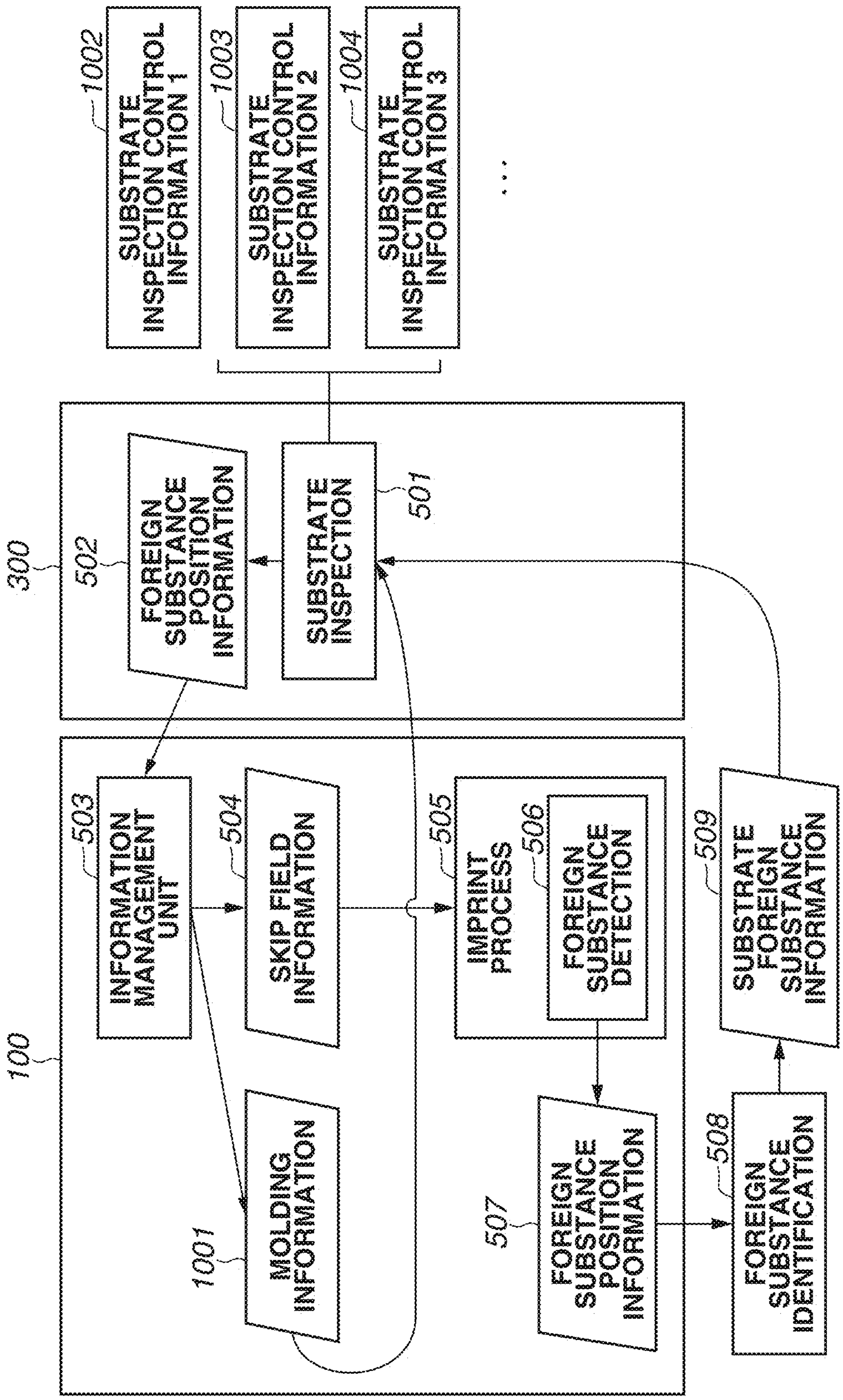
FIG. 10 is a data flow diagram of a molding system.

A second exemplary embodiment according to the present disclosure is described. The present exemplary embodiment basically takes over the first exemplary embodiment. Items other than those mentioned below can follow the first exemplary embodiment. FIG. 10 is the data flow of a molding system according to the present exemplary embodiment. In the second exemplary embodiment, type information regarding the substrate 1 is also taken into account.

In the manufacturing of an article, the processing performed on the substrate 1 before the imprint process may differ according to the purpose. For example, this corresponds to a case where a material used in the processing differs, or a case where the thickness of the substrate 1 differs. In this case, it is also preferable to optimize a foreign substance inspection control parameter according to the processing performed on the substrate 1. For example, in a case where a foreign substance is measured on the substrate 1 using a non-contact sensor, and if the wavelength and the output of the sensor to be used are not optimized according to the material or the thickness of the substrate 1, noise may be generated in the foreign substance detection and a foreign substance may be erroneously detected, or an existing foreign substance may not be detected.

Thus, the information management unit 503 according to the present exemplary embodiment generates and outputs the skip field information 504 and also outputs information regarding the processing performed on the substrate 1 or molding information 1001 that is equivalent to the information and allows the determination of the type of the substrate 1.

Then, the information management unit 503 transmits the molding information 1001 with the substrate foreign substance information 509 regarding a substrate foreign substance identified similarly to the first exemplary embodiment to the foreign substance inspection apparatus 300, and the foreign substance inspection apparatus 300 saves substrate inspection control information 1002 to 1004 with respect to each piece of type information, i.e., each piece of the molding information 1001, regarding the substrate 1. As described above, every time the substrate 1 is processed, an inspection condition (a control parameter) is updated, whereby it is possible to perform the substrate inspection 501 by switching inspection conditions with respect to each substrate 1. That is, it is possible to give feedback to an inspection condition when the substrate inspection 501 is performed, and improve the foreign substance detection accuracy of the foreign substance inspection apparatus 300.

Figure 11:
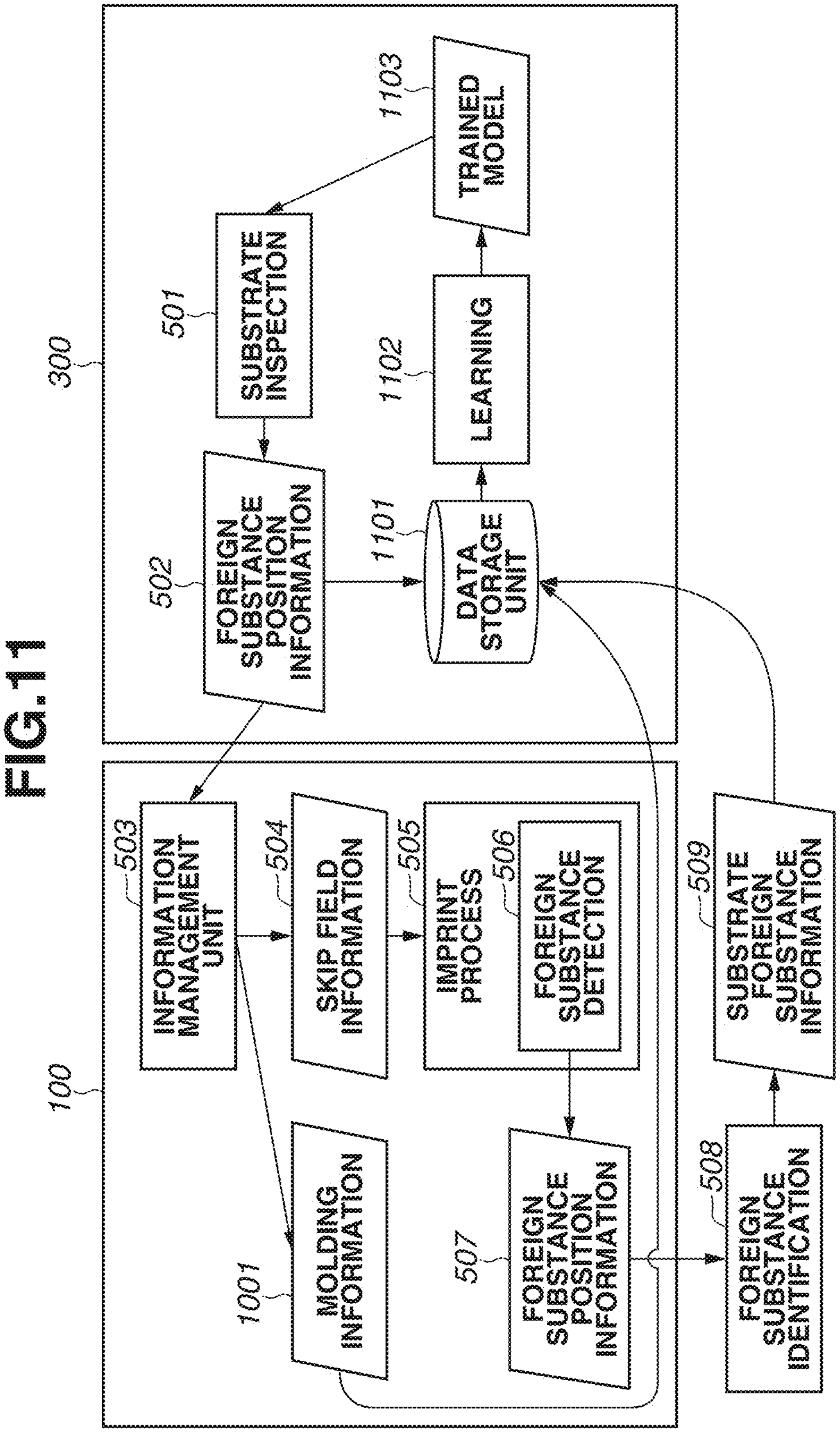
FIG. 11 is a data flow diagram of a molding system.

A third exemplary embodiment according to the present disclosure is described. The present exemplary embodiment basically takes over the first exemplary embodiment. Items other than those mentioned below can follow the first exemplary embodiment. FIG. 11 is the data flow of a molding system according to the present exemplary embodiment. In the third exemplary embodiment, machine learning is used to update an inspection control parameter for the foreign substance inspection apparatus 300.

In the present exemplary embodiment, the foreign substance position information 502 regarding a foreign substance position inspected by the foreign substance inspection apparatus 300 and the substrate foreign substance information 509 regarding a substrate foreign substance identified based on the foreign substance position of a foreign substance detected during the imprint process are combined together, thereby performing machine learning using the checking of answers against the result of foreign substance inspection performed by the foreign substance inspection apparatus 300.

First, a data storage unit 101 collects and stores the foreign substance position information 502 regarding a foreign substance position inspected by the foreign substance inspection apparatus 300 and the substrate foreign substance information 509 regarding a substrate foreign substance identified based on the foreign substance position of a foreign substance detected during the imprint process. Then, using these pieces of data stored in the data storage unit 101, supervised learning 1102 is performed on the assumption that a foreign substance is not detected. Then, a trained model 1103 for the foreign substance inspection apparatus 300 is constructed, and an inspection control parameter for use in the substrate inspection 501 is updated based on the trained model 1103. That is, a detection condition is updated so that the foreign substance position information 502 regarding a foreign substance position that is not detected by the foreign substance inspection apparatus 300 is detected.

In a factory that processes a large number of substrates a day, it is assumed that if foreign substance information regarding each substrate is fed back to an inspection condition for the foreign substance inspection apparatus 300 each time, the amount of data becomes enormous. Accordingly, by using a technique in which machine learning outputs only an optimal condition to obtain optimal control without feeding back the enormous data each time, it is possible to increase the number of pieces of data to be processed even in a case where many types of foreign substances are mixed and feedback is not simple. Thus, it is possible to improve the foreign substance detection performance of the foreign substance inspection apparatus 300.

While desirable exemplary embodiments of the present disclosure have been described above, the present disclosure is not limited to these exemplary embodiments, and can be modified and changed in various ways within the scope of the present disclosure.

Although the above exemplary embodiments have been described using an example where the foreign substance inspection apparatus 300 and the imprint apparatus 100 are present in the same molding system, the foreign substance inspection apparatus 300 and the imprint apparatus 100 do not necessarily need to be present in the same system, and only need to be able to share information regarding foreign substance inspection performed by the other.

<Exemplary Embodiment Regarding Article Manufacturing Method>

An article manufacturing method according to an exemplary embodiment of the present disclosure is suitable for manufacturing an article such as a micro device, e.g., a semiconductor device, or an element having a microstructure. The article manufacturing method according to the present exemplary embodiment includes a molding step of molding a composition on a substrate using the above molding apparatus (imprint apparatus or planarization apparatus), a processing step of processing the substrate on which the composition is molded in the molding step, and a manufacturing step of manufacturing an article from the substrate processed in the processing step. Further, this manufacturing method includes other known steps (oxidation, film formation, vapor deposition, doping, planarization, etching, resist removal, dicing, bonding, and packaging). The article manufacturing method according to the present exemplary embodiment has an advantage over a conventional method in at least one of the performance, the quality, the productivity, and the production cost of an article.

The pattern of a cured product molded using the above molding apparatus is permanently used in at least a part of each of various articles or temporarily used to manufacture each of various articles. Examples of the article include an electric circuit element, an optical element, microelectromechanical systems (MEMS), a recording element, a sensor, and a mold. Examples of the electric circuit element include volatile or non-volatile semiconductor memories such as a dynamic random-access memory (DRAM), a static random-access memory (SRAM), a flash memory, and a magnetoresistive random-access memory (MRAM), and semiconductor devices such as a large-scale integration (LSI) device, a charge-coupled device (CCD), an image sensor, and a field-programmable gate array (FPGA). Examples of the mold include a mold for imprint.

The pattern of the cured product is used as it is as a component member of at least a part of the article or temporarily used as a resist mask. After etching or ion implantation is performed in the step of processing the substrate, the resist mask is removed.

Figure 12A:
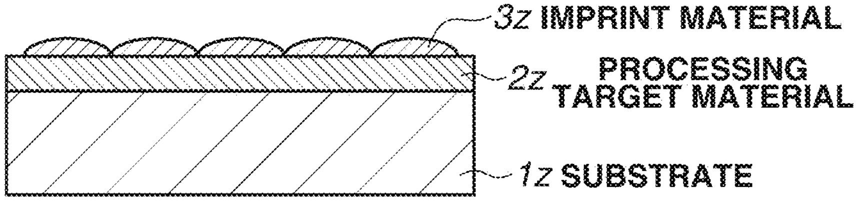
FIGS. 12A to 12F are diagrams for describing an article manufacturing method.

Next, a description is given of a specific method for manufacturing an article in a case where the imprint apparatus is used as the molding apparatus. As illustrated in FIG. 12A, a substrate 1*z* such as a silicon wafer, on the surface of which a processing target material 2*z* such as an insulator is formed, is prepared. Next, an imprint material 3*z* is applied to the surface of the processing target material 2*z* by an inkjet method. FIG. 12A illustrates the state where the imprint material 3*z* in the form of a plurality of droplets is applied onto the substrate 1*z*.

Figure 12B:
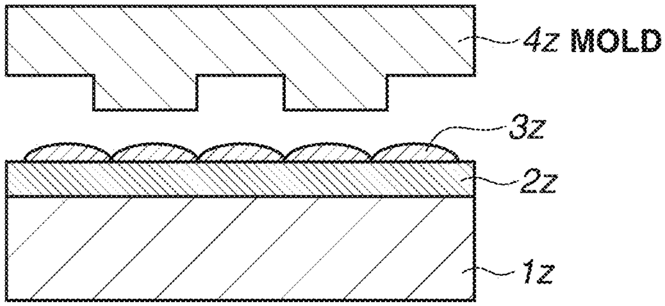
Figure 12C:
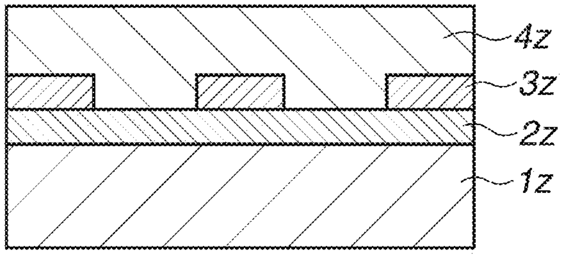

As illustrated in FIG. 12B, the side of a mold 4*z* for imprint where an uneven pattern is formed is directed and opposed to the imprint material 3*z* on the substrate 1*z*. As illustrated in FIG. 12C, the substrate 1*z* onto which the imprint material 3*z* is applied and the mold 4*z* are brought into contact with each other, and pressure is applied to the substrate 1*z* and the mold 4*z*. The imprint material 3*z* fills the gap between the mold 4*z* and the processing target material 2*z*. If light as curing energy is emitted through the mold 4*z* to the imprint material 3*z* in this state, the imprint material 3*z* cures.

Figure 12D:
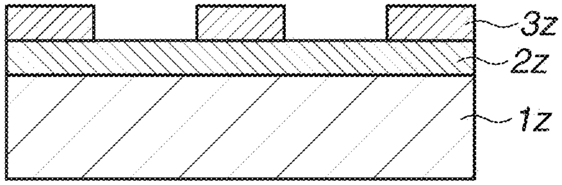

As illustrated in FIG. 12D, after the imprint material 3*z* is cured, and if the mold 4*z* and the substrate 1*z* are separated from each other, the pattern of the cured product of the imprint material 3*z* is formed on the substrate 1*z*. This pattern of the cured product has such a shape that a recessed portion of the mold 4*z* corresponds to a protruding portion of the cured product, and a protruding portion of the mold 4*z* corresponds to a recessed portion of the cured product. That is, the uneven pattern of the mold 4*z* is transferred to the imprint material 3*z*.

Figure 12E:
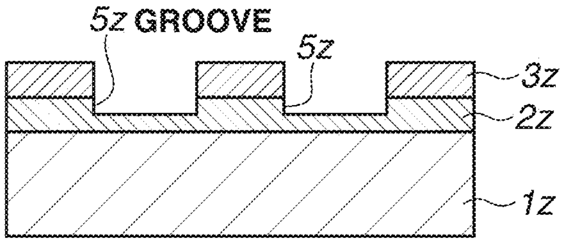
Figure 12F:
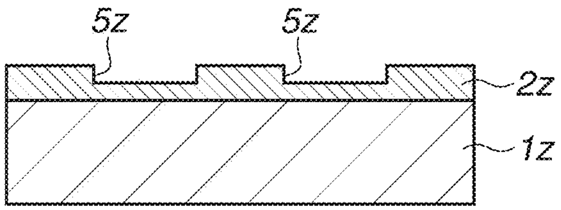

As illustrated in FIG. 12E, if etching is performed using the pattern of the cured product as an etching-resistant mask, then in the surface of the processing target material 2*z*, a portion where the cured product is not present or thinly remains is removed, thereby forming grooves 5*z*. As illustrated in FIG. 12F, if the pattern of the cured product is removed, an article in which the grooves 5*z* are formed on the surface of the processing target material 2*z* can be obtained. Although the pattern of the cured product is removed in this case, the pattern of the cured product may not be removed even after the processing, and may be used as, for example, an interlayer insulating film included in a semiconductor device, i.e., a component member of the article.

<Exemplary Embodiment Regarding Planarization Process>

Although in the above exemplary embodiments, a mold for transferring a circuit pattern on which an uneven pattern is formed has been described as the mold, the mold may be a mold (a flat surface template) having as a contact surface a flat surface on which an uneven pattern is not formed. The flat surface template is used in a planarization apparatus (a molding apparatus) that performs a planarization process (a molding process) for molding a composition on a substrate by planarizing the composition using a flat surface. The planarization process includes the step of, in the state where the flat surface (the contact surface) of the flat surface template is in contact with a curable composition supplied onto a substrate, curing the curable composition by emitting light to the curable composition or heating the curable composition. As described above, the present exemplary embodiment is applicable to a molding apparatus that molds a composition on a substrate using a flat surface template.

Figure 13A:
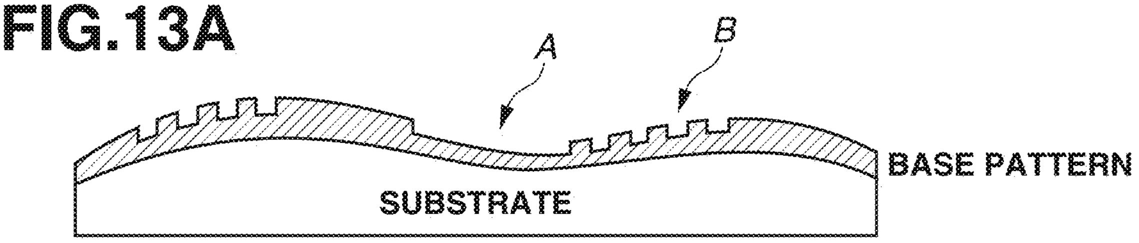
FIGS. 13A to 13D are diagrams for describing a planarization process.

A base pattern on a substrate has an uneven profile caused by a pattern formed in a previous step. Particularly, with the multilayered structurization of a memory element in recent years, a substrate (a process wafer) may have a step of about 100 nm. The step caused by the gentle undulation of the entirety of the substrate can be corrected by a focus tracking function of an exposure apparatus (a scanner) used in a photolithography step. However, unevenness at fine pitches that fall within the area of an exposure slit of the exposure apparatus directly consumes the depth of focus (DOF) of the exposure apparatus. As a conventional art for planarizing a base pattern on a substrate, a technique for forming a planarization layer, such as spin-on carbon (SOC) or chemical mechanical planarization (CMP), is used. In the conventional art, however, as illustrated in FIG. 13A, at a boundary portion between an isolated pattern region A and a repeated dense (the concentration of lines and space patterns) pattern region B, only an unevenness reduction rate of 40% to 70% can be obtained, and sufficient planarization performance cannot be obtained. In the future, the difference in unevenness in a base pattern due to multilayering tends to further increase.

As a solution to this issue, U.S. Pat. No. 9,415,418 discusses a technique for forming a continuous film by applying a resist to be a planarization layer using an inkjet dispenser and by pressing the resist using a flat surface template. U.S. Pat. No. 8,394,282 discusses a technique for reflecting the result of a topography measurement on a substrate on light-and-shade information with respect to each position where an instruction is given to apply a resist using an inkjet dispenser. Particularly, an imprint apparatus IMP is applicable to a flat processing (planarization) apparatus that presses a flat surface template as a mold against an uncured resist applied in advance, thereby locally planarizing the inside of the surface of a substrate.

FIG. 13A illustrates a substrate before flat processing is performed. In an isolated pattern region A, the area of a pattern protruding portion is small. In a repeated dense pattern region B, the ratio between the area of a pattern protruding portion and the area of a pattern recessed portion is 1:1. The average heights of the isolated pattern region A and the repeated dense pattern region B have values that differ according to the proportions of the pattern protruding portions.

Figure 13B:
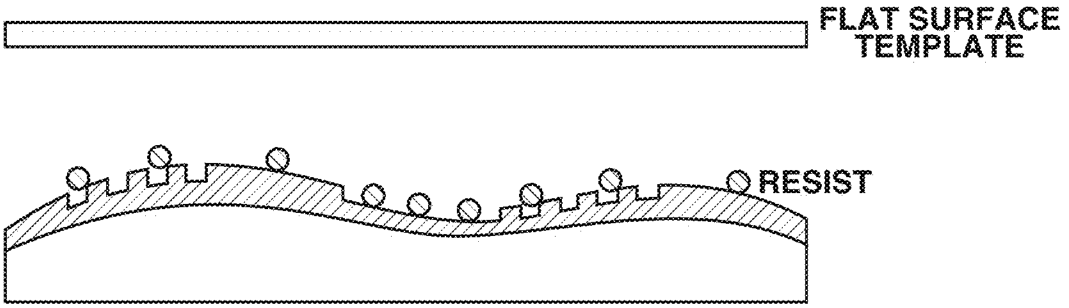

FIG. 13B illustrates the state where a resist for forming a planarization layer is applied to the substrate. Although FIG. 13B illustrates the state where the resist is applied using an inkjet dispenser based on the technique discussed in U.S. Pat. No. 9,415,418, the resist may be applied using a spin coater. In other words, the imprint apparatus IMP is applicable so long as the imprint apparatus IMP includes the step of planarizing an uncured resist applied in advance by pressing a flat surface template against the uncured resist.

Figure 13C:
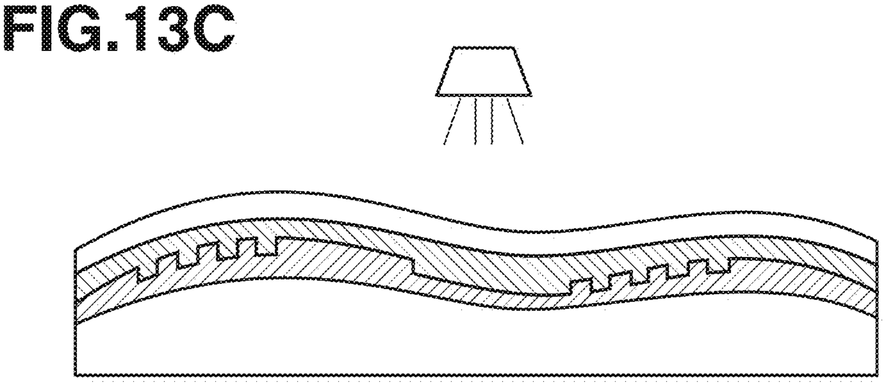
Figure 13D:
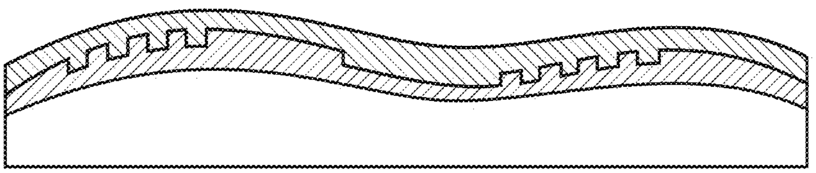

As illustrated in FIG. 13C, a flat surface template is composed of glass or quartz that transmits ultraviolet light, and the resist cures by emitting ultraviolet light to the resist from a light source. The flat surface template follows the profile of the surface of the substrate on the gentle unevenness of the entirety of the substrate. Then, after the resist cures, as illustrated in FIG. 13D, the flat surface template is pulled away from the resist.

According to the present disclosure, it is possible to provide a configuration having an advantage in detecting a foreign substance on a substrate before a molding process is performed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-162682, filed Sep. 26, 2023, which is hereby incorporated by reference herein in its entirety.

What is claimed is:

1. A molding system including a foreign substance inspection apparatus configured to inspect a foreign substance on a substrate to be subjected to a molding process, and a molding apparatus configured to perform a molding process for bringing a mold into contact with the substrate on which a foreign substance is inspected by the foreign substance inspection apparatus, thereby molding a composition on the substrate, the molding apparatus comprising:

a detection unit configured to detect foreign substance positions on the substrate during the molding process; and a control unit configured to identify, among the foreign substance positions detected by the detection unit, a substrate foreign substance position where a foreign substance is present on the substrate before the molding process is started by the molding apparatus, wherein an inspection condition used to inspect a foreign substance by the foreign substance inspection apparatus is updated based on the substrate foreign substance position identified by the control unit.

2. The molding system according to claim 1, wherein using a position of a field on which the molding process is performed and a type of the mold that is currently used, the control unit identifies, among the foreign substance positions detected by the detection unit, a substrate foreign substance position where a foreign substance is present first on the substrate.

3. The molding system according to claim 2, wherein in a case where the control unit identifies the substrate foreign substance position further using a state of a field before the molding process is performed.

4. The molding system according to claim 1, wherein the control unit performs control so that the molding process is not performed on a field where a foreign substance is found by the foreign substance inspection apparatus.

5. The molding system according to claim 1, wherein the detection unit inspects a foreign substance while the composition on the substrate and the mold are in contact with each other.

6. The molding system according to claim 1, wherein the detection unit detects foreign substance positions on the substrate by comparing a reference image in which a foreign substance is not present and an acquired image acquired during the molding process.

7. The molding system according to claim 1, wherein the molding apparatus is an imprint apparatus configured to perform an imprint process for bringing a mold having an uneven pattern into contact with a composition on a substrate.

8. The molding system according to claim 1, wherein the molding apparatus is a planarization apparatus configured to perform a planarization process for bringing a mold having a flat surface into contact with a composition on a substrate.

9. A molding method for molding a composition on a substrate by bringing a mold into contact with the substrate, the molding method comprising:

inspecting a foreign substance on a substrate;

bringing a mold into contact with the substrate on which a foreign substance is inspected, thereby molding a composition on the substrate;

detecting foreign substance positions on the substrate during the molding;

identifying, among the detected foreign substance positions, a substrate foreign substance position where a foreign substance is present on the substrate before the molding is started; and updating an inspection condition used to inspect a foreign substance based on the identified substrate foreign substance position.

10. An article manufacturing method comprising:

molding a composition on a substrate using a molding system including a foreign substance inspection apparatus configured to inspect a foreign substance on a substrate to be subjected to a molding process, and a molding apparatus configured to perform a molding process for bringing a mold into contact with the substrate on which a foreign substance is inspected by the foreign substance inspection apparatus, thereby molding a composition on the substrate; and processing the substrate on which the composition is molded, wherein an article is manufactured from the processed substrate, the molding apparatus comprising:

a detection unit configured to detect foreign substance positions on the substrate during the molding process; and a control unit configured to identify, among the foreign substance positions detected by the detection unit, a substrate foreign substance position where a foreign substance is present on the substrate before the molding process is started by the molding apparatus, wherein an inspection condition used to inspect a foreign substance by the foreign substance inspection apparatus is updated based on the substrate foreign substance position identified by the control unit.

* * * * *